United States Patent Office 3,734,817
Patented May 22, 1973

3,734,817
TREATED QUARTZ VESSELS FOR USE IN PRODUCING AND FURTHER PROCESSING III–V SEMICONDUCTOR BODIES LOW IN SILICON
Klaus Bienert, Winfried Lang, and Egon Nordt, Burghausen, Upper Bavaria, Germany, assignor to Wacker-Chemitronic Gesellschaft fur Elektronik-Grundstoffe m.b.H., Burghausen, Upper Bavaria, Germany
No Drawing. Filed Nov. 23, 1970, Ser. No. 92,318
Claims priority, application Germany, Nov. 26, 1969,
P 19 59 392.1
Int. Cl. B32b 17/06
U.S. Cl. 161—192         1 Claim

ABSTRACT OF THE DISCLOSURE

A vessel particularly a phial or an ampoule for use in producing, and further processing, III–V semiconductor bodies low in silicon, which vessel is composed of quartz having its inside wall coated with a substance which is inert at the working temperature. Semiconductor bodies produced or further processed in such a vessel contain much less silicon than similar bodies produced or processed in conventional quartz vessels.

---

III–V semiconductor bodies with volatile components and/or volatile doping substances are usually produced, and further processed, in quartz apparatus. Quartz suggests itself as a phial or crucible material because even at high temperatures it releases hardly any impurities and it is largely temperature stable. Also, it is gas tight and is easily processed into complicated shapes. Moreover, it is hardly at all affected by chemical reagents.

However, numerous tests have shown that during the production of III–V semiconductor compounds, silicon appears as the principal impurity. The cause is generally the attack by the III–V melt upon the quartz lining of the crucibles and boats. In order to prevent this a method was previously described for holding the melt during the crystal growing in boron nitride-, aluminum nitride- or aluminum oxide vessels (British Pat. No. 1,065,728). In this manner it was possible to lower the silicon content of, for instance, gallium arsenide semiconductor bodies.

However, it has been found that this measure alone is not sufficient for producing silicon-low III–V semiconductor bodies, particularly if the quartz lining of the phial gets very hot in certain spots, as is the case with all methods of resistance heating. Via the gas phase silicon gets from the quartz wall into the III–V melt. This is caused by traces of water and oxygen adsorbed on the quartz surface, which induce transfer reactions. To prevent this transfer reaction it was suggested to purify the reaction vessels as completely as possible by lengthy heating processes which are necessary because of the observed good adhesion of moisture and oxygen particularly on quartz surfaces. (L. R. Wiesberg, F. D. Rosi and P. G. Herkart, "Properties of Elemental and Compound Semi-Conductors," vol. V, Interscience, N.Y., 1960). A further improvement was achieved by this.

But this method is not only time-consuming, it is also limited in its mode of action because many other substances attack quartz under the rigorous conditions of producing and processing III–V compounds at least to such an extent that the purity required in the production of semi-conductors cannot be achieved. Thus it has been found during sublimation experiments with purest arsenic that arsenic attacks the quartz wall or lining already at temperatures around 450° C. Moreover, the silicon content in the sublimate increases as the temperature rises and the duration is prolonged. Other elements like gallium, phosphorus, zinc or selenium likewise have a reducing effect on the quartz lining, so that elemental silicon may pass over into the vapor phase.

We have now discovered that silicon-low products can be obtained by using quartz vessels particularly phials or ampoules whose inside walls are protected by substances which are inert at the working temperatures, for producing and/or further processing silicon-poor III–V semiconductor bodies with one or several volatile and reducing components and/or with reducing and volatile doping substances, if desired in the presence of other reducing gases.

Suitable substances which are inert at the working temperature are, for instance, gallium arsenide, aluminum oxide, boron oxide, and particularly boron nitride and aluminum nitride. These substances alone are not suitable for use as vessels for producing and further processing III–V semiconductor bodies.

The quartz phials or ampoules may be protected in various ways against the aggressive substances. For instance, the wall can be lined with inert substances. Thus by passing boron compounds and ammonia into the quartz vessel, a layer of boron nitride can be produced which adheres well to the inside wall. Also, the quartz wall can be protected easily by a film of boron oxide. Also it is possible to make a paste adhesive from boron oxide and boron nitride, boron oxide and aluminum nitride or boron oxide and aluminum oxide, to brush it on the walls and subsequently harden it.

Another form of carrying out the invention is to insert into the quartz ampoule a pipe made of inert materials. The work stages are carried out in this pipe. The pipe is closed with two stoppers. Particularly suitable for this method are boron nitride-, aluminum nitride- and aluminum oxide pipes. These pipes cannot be used as vessels for producing or further processing of III–V semiconductor bodies without quartz vessels, because they do not have a great mechanical firmness, and, furthermore, they are not gas tight.

Important III–V semiconductor bodies for use in vessels of the invention are for instance gallium arsenide, gallium phosphide, indium arsenide, indium phosphide, aluminum phosphide. Mixed crystals of these compounds are also suitable. Phosphorus, arsenic and gallium have been found to be particularly aggressive.

Even volatile and reducing doping substances like e.g. zinc, selenium, sulphur and cadmium attack the unprotected walls.

Moreover, the presence of reducing gases like hydrogen, hydrogen arsenide, hydrogen phosphide, likewise causes an increased silicon content of the semiconductor bodies. In such cases, too, the quartz vessels of the invention prevent the pollution by silicon.

All operations which are used for producing and further processing of III–V semiconductor bodies can be carried out in the quartz vessels of the invention. One should mention in particular the production by the drawing method, the epitactic deposition and diffusion. Generally the working temperatures are between 600 and 1600° C.

EXAMPLE 1

In a boron nitride boat undoped gallium arsenide crystals were drawn according to the known Bridgeman method with resistance heating in an ampoule about 1 m. long and having a diameter of 40 cm. (F. A. Cunnel in R. K. Willardson and H. G. Goering, Compound Semi-Conductors, Vol. 1, Reinhold, N.Y., 1962). The temperatures in the melting zone were about 1240° C. and in the arsenic zone about 618° C. A drawing speed of 2 cm. per hour was maintained. For the silicon content of gallium arsenide with unprotected quartz surface a typical value of 80 p.p.m. was found. Under the same conditions the silicon content dropped to 3 p.p.m. when a pipe lined on the inside with boron nitride was used.

EXAMPLE 2

Into a quartz ampoule-gallium arsenide discs and zinc were placed and at about 910° C. and a zinc vapor pressure of about 1 atmosphere zinc was introduced by diffusion (the doping was carried out in accordance with L. L. Chang and G. L. Parson, J. Appl. Phys. 35, pages 1960–1965 (1964)). Together with the zinc a larger quantity of silicon was also diffused into the gallium arsenide discs. The doping was now carried out in a quartz tube which contained a boron nitride pipe with a diameter of 40 mm. which was made tight on both ends by two stoppers. The silicon content of the discs doped in this manner was only about a quarter of what it had been.

EXAMPLE 3

In a quartz ampoule with and without an inside aluminum oxide lining an epitaxial layer of gallium arsenide was developed on high-resistance gallium arsenide substrate at 1120° C. according to the method described in British Pat. No. 1,084,817, by conducting arsenic vapor across a gallium arsenide source of 1220° C. The layers developed in the pipe protected by aluminum oxide were lower in silicon by the factor of 3.

EXAMPLE 4

In a crucible apparatus gallium arsenide was drawn monocrystalline from a boron nitride crucible (according to D.B.P. #1,233,828). When using quartz vessels which before use had been coated on the inside with a mixture of boron oxide and boron nitride, the silicon content in the crystal and in the crucible regulus went down from a typical value of 50 p.p.m. to about 7 p.p.m.

The invention claimed is:

1. A quartz vessel adapted for the production and further processing of III–V semiconductor bodies having an extremely low silicon content of the order of 3 to 7 p.p.m. comprising a tubular quartz phial or ampoule having extending through the interior thereof an insertable tubular liner member made of a material selected from the group consisting of boron nitride, aluminum nitride and aluminum oxide, the outer surface of said liner member being in contact with the inner surface of said quartz vessel.

References Cited

UNITED STATES PATENTS

| | | | |
|---|---|---|---|
| 2,972,555 | 2/1961 | Deutscher | 117—95 X |
| 2,989,421 | 6/1961 | Novak | 117—95 X |
| 3,471,324 | 10/1969 | Wilson et al. | 117—106 AX |

EDWARD G. WHITBY, Primary Examiner

U.S. Cl. X.R.

117—97, 106 R, 124 A, DIG.10; 148—174; 161—193; 264—30